United States Patent
Kimiabeigi

(10) Patent No.: US 9,496,760 B2
(45) Date of Patent: Nov. 15, 2016

(54) GENERATOR, IN PARTICULAR FOR A WIND TURBINE

(75) Inventor: Mohammad Kimiabeigi, Sheffield (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 1062 days.

(21) Appl. No.: 13/160,585

(22) Filed: Jun. 15, 2011

(65) Prior Publication Data

US 2011/0316288 A1 Dec. 29, 2011

(30) Foreign Application Priority Data

Jun. 25, 2010 (EP) .................... 10167320

(51) Int. Cl.
| | |
|---|---|
| F03D 9/00 | (2016.01) |
| H02K 1/27 | (2006.01) |
| H02K 1/32 | (2006.01) |
| H02K 1/20 | (2006.01) |
| H02K 7/18 | (2006.01) |

(52) U.S. Cl.
CPC .............. *H02K 1/2786* (2013.01); *H02K 1/32* (2013.01); *H02K 1/20* (2013.01); *H02K 7/1838* (2013.01); *Y02E 10/725* (2013.01)

(58) Field of Classification Search
CPC ........ H02K 1/20; H02K 1/2786; H02K 1/32; H02K 7/1838; Y02E 10/725
USPC .......................... 310/59, 64, 156.46; 290/1 B
See application file for complete search history.

(56) References Cited

U.S. PATENT DOCUMENTS

| | | | | |
|---|---|---|---|---|
| 4,580,072 | A * | 4/1986 | Morishita | 310/154.15 |
| 4,980,593 | A * | 12/1990 | Edmundson | 310/154.26 |
| 5,095,238 | A * | 3/1992 | Suzuki et al. | 310/156.46 |
| 5,233,250 | A * | 8/1993 | De Filippis | 310/156.45 |
| 5,500,994 | A * | 3/1996 | Itaya | 29/598 |
| 6,026,064 | A * | 2/2000 | Izumi et al. | 369/44.22 |
| 6,081,058 | A * | 6/2000 | Suzuki et al. | 310/156.45 |
| 6,700,280 | B1 * | 3/2004 | Geiger et al. | 310/193 |
| 6,727,630 | B1 * | 4/2004 | Maslov et al. | 310/254.1 |
| 6,817,507 | B2 * | 11/2004 | Yeon | 226/188 |
| 6,858,960 | B1 * | 2/2005 | Muszynski | 310/156.47 |
| 7,122,923 | B2 * | 10/2006 | Lafontaine et al. | 310/58 |
| 7,279,820 | B2 * | 10/2007 | Grundl et al. | 310/156.02 |
| 7,671,501 | B2 * | 3/2010 | Groening | 310/114 |
| 8,129,877 | B2 * | 3/2012 | Booth et al. | 310/64 |
| 2002/0053838 | A1 * | 5/2002 | Okuda | 310/59 |
| 2005/0035673 | A1 * | 2/2005 | Lafontaine et al. | 310/58 |
| 2005/0225194 | A1 * | 10/2005 | Murakami et al. | 310/216 |
| 2005/0264122 | A1 * | 12/2005 | Domeki et al. | 310/156.46 |
| 2006/0055266 | A1 * | 3/2006 | Iwami et al. | 310/156.47 |

(Continued)

FOREIGN PATENT DOCUMENTS

| | | |
|---|---|---|
| CN | 101728898 A | 6/2010 |
| DE | 102004031329 A1 | 1/2006 |

(Continued)

*Primary Examiner* — Alex W Mok

(57) ABSTRACT

A generator is provided, which includes a stator with a plurality of induction coils and a rotor rotatable around the stator with at least one permanent magnet or a plurality of permanent magnets arranged in circumferential direction. The generator also includes at least one airduct for guiding an air flow to the stator, wherein the at least one permanent magnet is or the plurality of permanent magnets are provided with recesses arranged opposite to the stator. In one embodiment, the generator is a generator of a wind turbine.

10 Claims, 2 Drawing Sheets

(56) References Cited

U.S. PATENT DOCUMENTS

| | | | |
|---|---|---|---|
| 2007/0103027 A1* | 5/2007 | Jansen et al. | 310/266 |
| 2007/0252465 A1* | 11/2007 | Sasaki et al. | 310/156.26 |
| 2008/0150381 A1* | 6/2008 | Groening | 310/95 |
| 2009/0039726 A1* | 2/2009 | Westermark et al. | 310/207 |
| 2009/0261679 A1* | 10/2009 | Sakai et al. | 310/156.53 |
| 2010/0026126 A1* | 2/2010 | Han et al. | 310/156.46 |
| 2010/0102655 A1* | 4/2010 | Eriksen et al. | 310/63 |
| 2010/0102656 A1* | 4/2010 | Booth et al. | 310/64 |
| 2010/0102657 A1* | 4/2010 | Booth et al. | 310/64 |
| 2010/0133940 A1* | 6/2010 | Grossmann et al. | 310/156.46 |
| 2010/0213885 A1* | 8/2010 | Ichiyama | 318/720 |
| 2010/0237727 A1* | 9/2010 | Mantere | 310/64 |

FOREIGN PATENT DOCUMENTS

| | | | | |
|---|---|---|---|---|
| JP | 57189551 A | * | 11/1982 | H02K 23/04 |
| JP | 04295242 A | * | 10/1992 | H02K 1/27 |

* cited by examiner

GENERATOR, IN PARTICULAR FOR A WIND TURBINE

CROSS REFERENCE TO RELATED APPLICATIONS

This application claims priority of European Patent Office application No. 10167320.0 EP filed Jun. 25, 2010, which is incorporated by reference herein in its entirety.

FIELD OF INVENTION

The present invention relates to a generator, in particular for a wind turbine, comprising a stator with a plurality of induction coils; a rotor, rotatable around the stator, with at least one permanent magnet or a plurality of permanent magnets, arranged in circumferential direction, and at least one airduct for guiding an air flow to the stator.

BACKGROUND OF INVENTION

Wind turbines are provided with a rotor shaft which is part of an electrical generator producing electricity during movement of the rotor relative to a stator of the generator. The stator comprises a number of coils, the rotor comprises a number of permanent magnets so that an electric voltage is induced when the rotor is turned.

In recent years a trend towards wind turbines with increased power can be observed which requires an efficient cooling system for the generator. In conventional wind turbines airducts are used which are connected to the cooling source in order to supply an air flow to the stator, windings of the stator and the magnets of the rotor. Due to the increasing size of the wind turbines the number and size of the permanent magnets is raising as well, which leads to higher costs for the generator.

SUMMARY OF INVENTION

It is therefore an object of the present invention to provide a generator with reduced manufacturing costs.

According to the present invention this object is achieved in the above defined generator in that the at least one permanent magnet or the plurality of permanent magnets are provided with recesses arranged opposite to the stator.

Preferably the recesses are positioned opposite of the airducts in the stator.

The present invention is based on the idea that a portion of the permanent magnet is electromagnetically poorly used or even unused so that these portions can be taken away. In this way less magnet material is necessary so that a lower weight of the generator and lower manufacturing costs are achieved. Further the invention leads to lower material costs. It has been found out that those portions of the permanent magnets which are placed in front of the stator airducts do not efficiently contribute to the generation of torque due to the relatively high saturation of the stator laminations near the airduct. According to the invention the permanent magnets are provided with recesses so that these unused parts of the magnet are reduced or even eliminated.

According to the invention the inventive generator may be provided with recesses which are shaped such that the magnet length at the side facing the stator is smaller than the magnet length at the side facing the rotor. This means that the magnets radial thickness in those regions that face radial airducts is smaller than the magnets radial thickness in those regions that face the stator lamination pack. Basically the at least one permanent magnet or the plurality of permanent magnets is shaped in the axial direction so that the magnet is provided with a non-uniform shape.

According to a first embodiment of the inventive generator the recesses can have a trapezoidal shape, whereby the longer edge of the parallel edges faces the rotor. It is possible to use a plurality of permanent magnets which have a shape of a trapezoid, alternatively one permanent magnet block can be used which is provided with a plurality of trapezoidal recesses.

According to another embodiment of the inventive generator the recesses may have a substantially triangular shape. Similar to the previous embodiment the generator may comprise a number of separate permanent magnets which have a triangular shape, as an alternative one magnet block can be used with a plurality of triangular recesses.

Preferably the edges of the recesses which are of a substantially triangular shape can be formed convex or concave.

In general the recesses simply may be formed concave which means that a permanent magnet block has concave recesses opposite to the stator.

According to a further development of the invention the at least one permanent magnet or the plurality of permanent magnets is or are arranged on a base plate of the rotor or on a rotor yoke.

According to a preferred embodiment of the invention the number of the permanent magnets and the airducts is the same.

In this case a recess may be positioned exactly opposite to an airduct of the stator.

However, according to a further development of the invention the number of permanent magnets in axial direction may be lower than the number of the airducts.

BRIEF DESCRIPTION OF THE DRAWINGS

The invention and its underlying principle will be better understood when consideration is given to the following detailed description of preferred embodiments.

In the accompanying drawings.

DETAILED DESCRIPTION OF INVENTION

Figure 1:
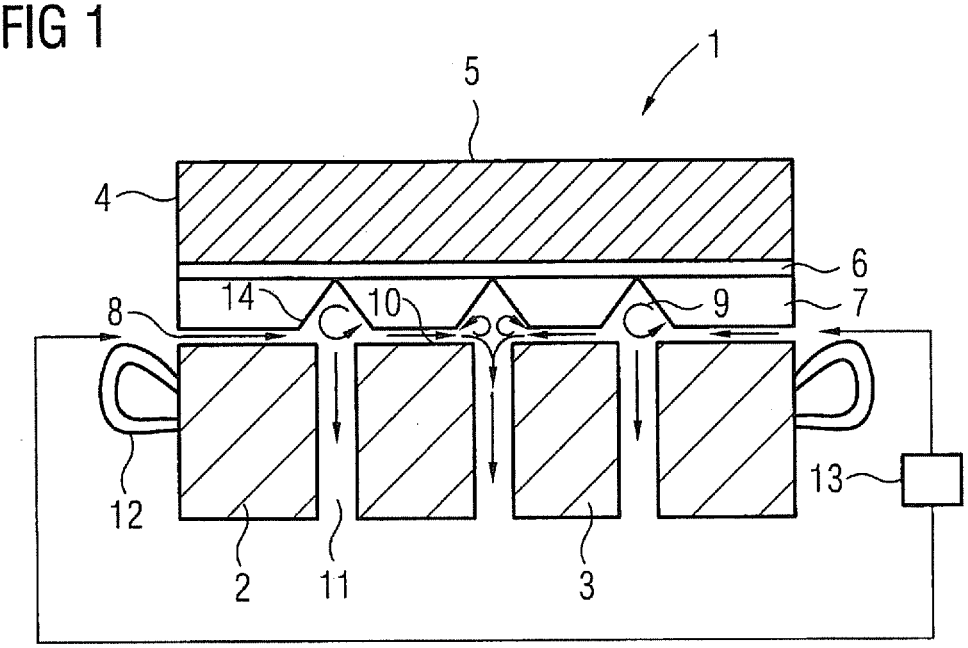
FIG. 1 is a sectional view of a first embodiment of an inventive generator.

FIG. 1 shows a portion of a generator 1 for a wind turbine in a radial sectional view. The generator 1 comprises a stator 2 with a plurality of induction coils 3. A rotor 4 is rotatable around the stator 2, the rotor 4 comprises a rotor yoke 5 with a base plate 6 and a number of permanent magnets 7, which are disposed on the base plate 6.

The rotor 4 is connected to a hub, which is not shown in FIG. 1, to which rotor blades are connected to. The stator 2 is disposed within a nacelle, which is mounted on top of a tower of the wind turbine. When the rotor 4 is rotated an electric current is induced in the induction coils 3 of the stator 2.

Between stator 2 and rotor 4 an axial gap 8 is disposed which is used as an airduct 9. An air flow is generated by a fan (not shown) and through the airduct 9 the air flow reaches the permanent magnets 7 and the induction coils 3. Basically the airduct 9 comprises an axial portion which is defined by the permanent magnets 7 and the outer edge 10 of the induction coils 3. Further the airduct 9 comprises radial portions 11 between neighboring induction coils 3. The arrows in FIG. 1 show the air flow through the airduct 9. The air flow is supplied such that endwindings 12, which are laterally protruding from the induction coils 3, are cooled as well. The fan which supplies the air flow to the airduct 9 is connected to a cooling source 13.

The permanent magnets 7 are provided with recesses 14 having a triangular shape which are disposed opposite to the stator 2. In the embodiment of FIG. 1 a plurality of permanent magnets 7 is used which are disposed next to each other in the axial direction. In the sectional view of FIG. 1 each permanent magnet 7 has a trapezoidal shape whereby the longer edge of the parallel edges faces the rotor 4. The recesses 14 are positioned opposite of the airducts 9 in the stator 2, in particular each of the recesses 14 is placed in front of a radial portion 11 of the airduct 9. In this area a permanent magnet cannot contribute to the generation of torque due to the high saturation of stator laminations. Therefore magnetic material is omitted which leads to the trapezoidal shape of the permanent magnets 7 as is depicted in FIG. 1. The amount of the magnet material and the weight of the generator is lower compared to a conventional generator where permanent magnets with a uniform shape in axial direction are used.

Another advantage is that due to the recesses 14 turbulences in the airflow are generated which lead to a better cooling of generator 1.

Figure 2:
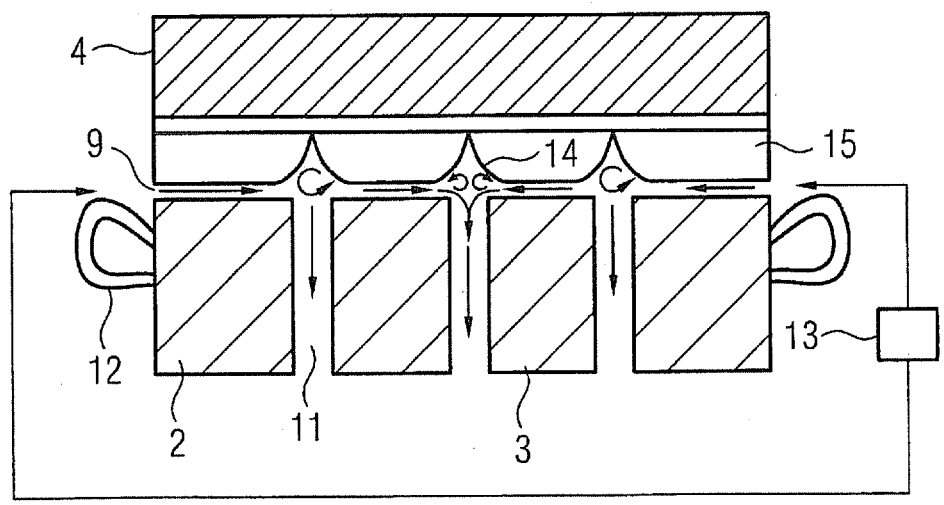
FIG. 2 is a sectional view of a second embodiment of an inventive generator.

FIG. 2 shows a second embodiment of a generator, where the same reference signs have been used for the same components. In general the generator of FIG. 2 has the same structure as the generator 1 of FIG. 1. In contrast to the first embodiment the permanent magnets 15 are provided with recesses with an arc-like or convex shape. The amount of the magnetic material of the generator as shown in FIG. 2 is slightly higher compared to the amount of magnetic material of the embodiment of FIG. 1. Consistently with the first embodiment the recesses 14 are provided opposite to the radial portions 11 of the airduct 9.

Figure 3:
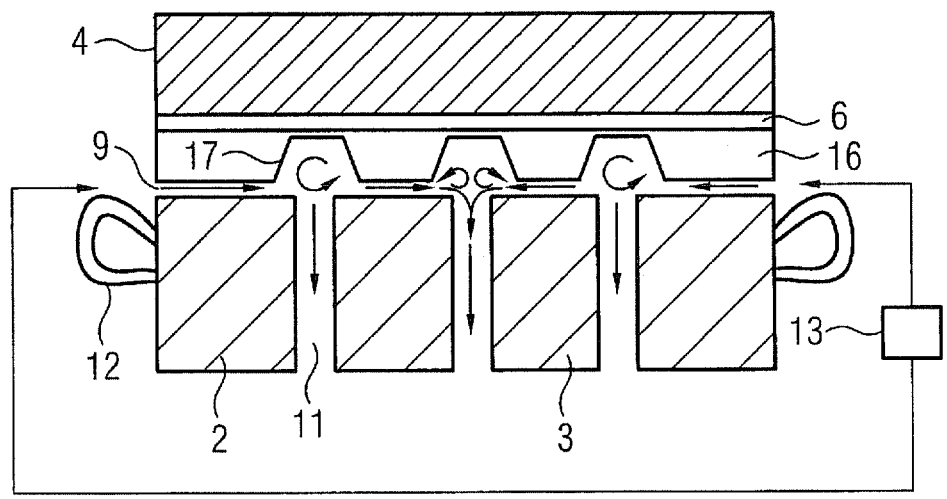
FIG. 3 is a sectional view of a third embodiment of an inventive generator.

FIG. 3 shows a third embodiment of a generator where the rotor 4 comprises one permanent magnet 16 in the form of a magnetic block which is provided with a plurality of recesses 17. The recesses 17 have a trapezoidal shape and the magnetic material is omitted opposite to radial portions 11 of the airduct 9. The recesses 17 are positioned opposite to radial portions 11 of the airduct 9. Due to the enlarged surface of the magnetic block a more efficient cooling of the magnetic block through the airflow is obtained.

Figure 4:
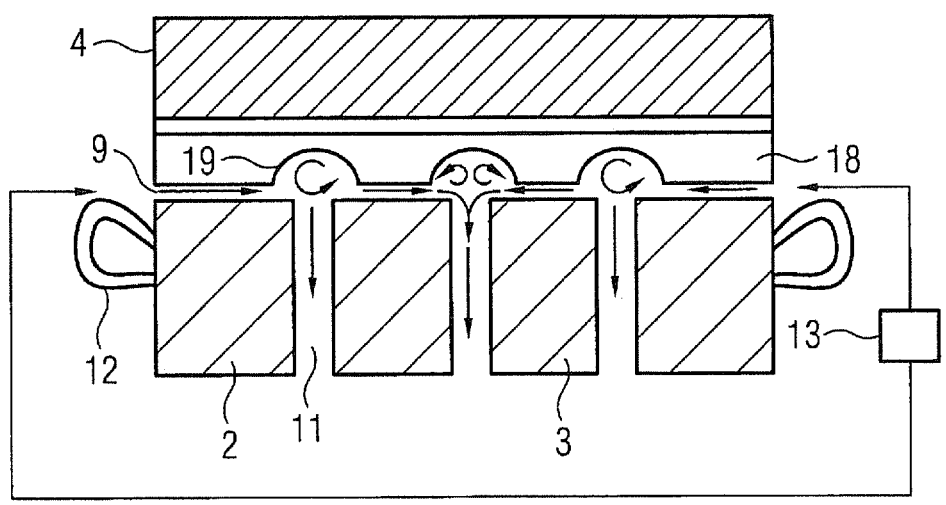
FIG. 4 is a sectional view of a fourth embodiment of an inventive generator.

FIG. 4 shows a fourth embodiment of a generator where the rotor 4 comprises a permanent magnet 18 with a plurality of recesses 19, which are arranged with a certain distance from each other. The recesses 19 are formed arc-like so that the permanent magnet 18 is smaller near the radial portion 11 of the airduct 9 and larger in between, opposite to the inductions coils 3 of the stator 2. The recesses 19 are positioned opposite of radial portions 11 of the airducts 9.

In the embodiments of FIG. 1 to FIG. 4 the number of the magnets or the number of the sections of the magnetic block is the same as the number of the induction coils 3.

The invention claimed is:

1. A generator, comprising:
   a stator comprising a plurality of axially spaced induction coils;
   a rotor rotatable around the stator, comprising one or more permanent magnets arranged in circumferential direction; and
   at least one airduct for guiding an air flow to the stator, comprising radial portions positioned between neighbouring induction coils,
   wherein the one or more permanent magnets is/are provided with recesses, each one of the recesses being positioned opposite to one of the radial portions of the at least on air-duct.

2. The generator according to claim 1, wherein the recesses are shaped such that an axial magnet length at a side facing the stator is smaller than an axial magnet length at the side facing the rotor.

3. The generator according to claim 1, wherein the recesses have a trapezoidal shape having a longer edge parallel to a shorter edge, wherein the longer edge faces the stator.

4. The generator according to claim 1, wherein the recesses have a substantially triangular shape.

5. The generator according to claim 4, wherein the edges of the recesses are formed convex or concave.

6. The generator according to claim 1, wherein the recesses are formed concave.

7. The generator according to claim 1, wherein the one or more permanent magnets is/are arranged on a base plate of the rotor.

8. The generator according to claim 1, wherein the number of the permanent magnets equals the number of induction coils.

9. The generator according to claim 1, wherein the number of permanent magnets is lesser than the number of airducts.

10. The generator according to claim 1, wherein the generator is a generator of a wind turbine.

* * * * *